United States Patent [19]

Barnes et al.

[11] Patent Number: 4,888,681
[45] Date of Patent: Dec. 19, 1989

[54] SPACE MANAGEMENT SYSTEM FOR DATA FILES HAVING SHARED ACCESS

[75] Inventors: Cherie C. Barnes, Barton; Robert B. Bennett, Endwell; Thomas J. Szczygielski, Endicott, all of N.Y.

[73] Assignee: International Business Machines Corporation, Armonk, N.Y.

[21] Appl. No.: 110,463

[22] Filed: Oct. 19, 1987

[51] Int. Cl.⁴ .............................................. G06F 1/00
[52] U.S. Cl. .................................................. 364/200
[58] Field of Search ........................ 364/200, 300, 900

[56] References Cited

U.S. PATENT DOCUMENTS

| | | | |
|---|---|---|---|
| 4,399,504 | 8/1983 | Obermarck et al. | 364/200 |
| 4,408,273 | 10/1983 | Plow | 364/200 |
| 4,432,057 | 2/1984 | Daniell et al. | 364/300 |
| 4,480,304 | 10/1984 | Carr et al. | 364/200 |
| 4,498,145 | 2/1985 | Baker et al. | 364/900 |
| 4,506,326 | 3/1985 | Shaw et al. | 364/300 |
| 4,507,751 | 3/1985 | Gawlich et al. | 364/900 |
| 4,641,274 | 2/1987 | Swank | 364/900 |
| 4,642,790 | 2/1987 | Minshull et al. | 364/900 |

Primary Examiner—Raulfe B. Zache
Attorney, Agent, or Firm—David S. Romney; William C. Roch

[57] ABSTRACT

A Space Management System for a Data Access System of a File Access Processor for servicing requests from a set of Application Support Processors, which can exist in a global network, with each Application Support Processor sharing access to data in files stored by the File access Processor. The File Access Processor manages access to a set of data files and information about files held in file directories, which allow for managing file collections, can relate to each other hierarchically, and may be shared. Each Application Support Processor also maintains therein an internal cache of file information to improve performance by reducing communications required with the File Access Processor for informatin about files. The File Access Processor provides the Application Support Processors with information for updating and maintenance of local caches of directory and file description information through a centralized accumulation and distribution of cache change notifications. The Space Management System manages file space assigned to each Application Support Processor and supports the space management functions of, adding space, deleting space, setting thresholds for limit warnings, querying space, charging space used, warning notifications, crediting space freed, and permitting file spaces to be shared by more than one application suppoort processor.

20 Claims, 11 Drawing Sheets

SPACE MANAGEMENT CONTROL STRUCTURES

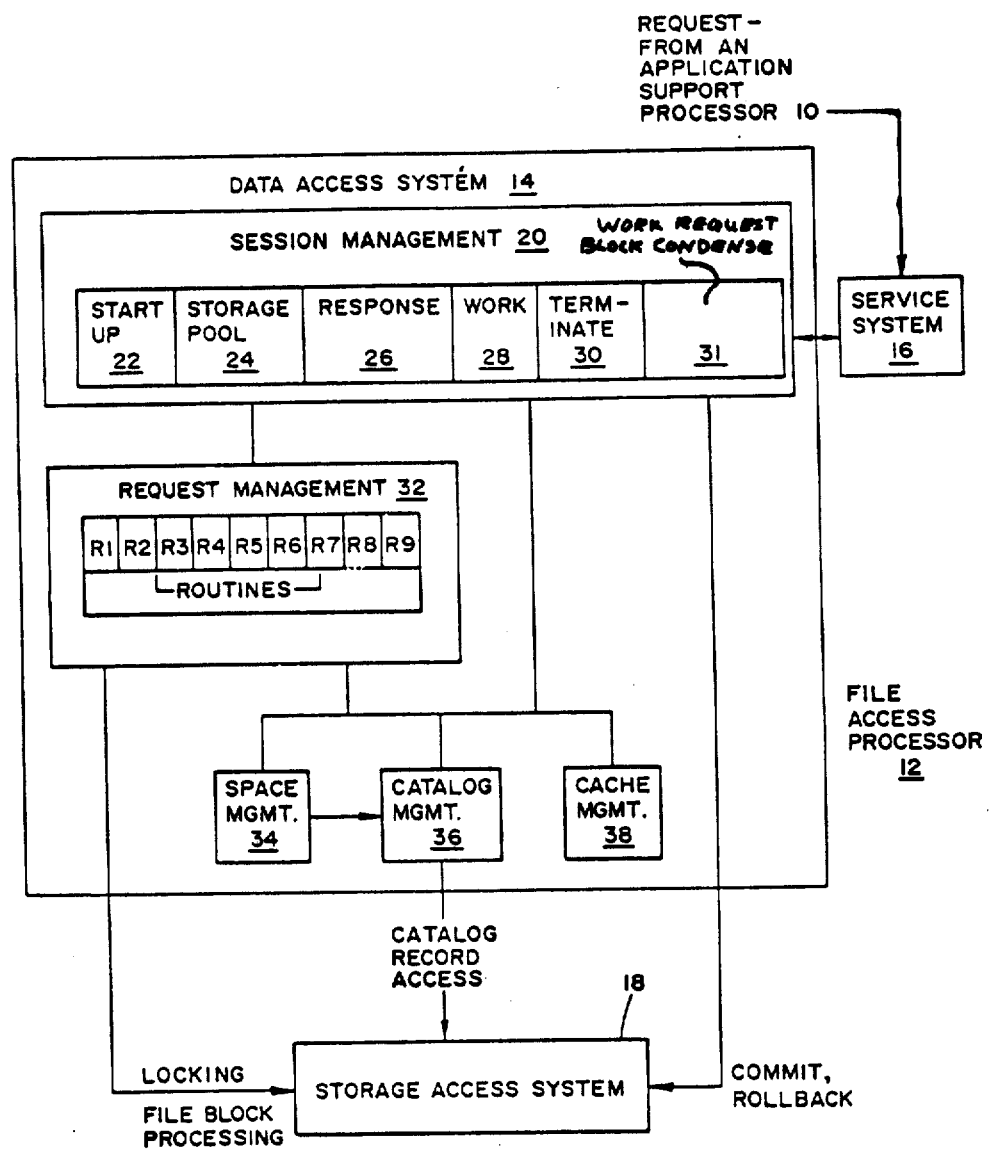
FIG.1 DATA ACCESS SYSTEM

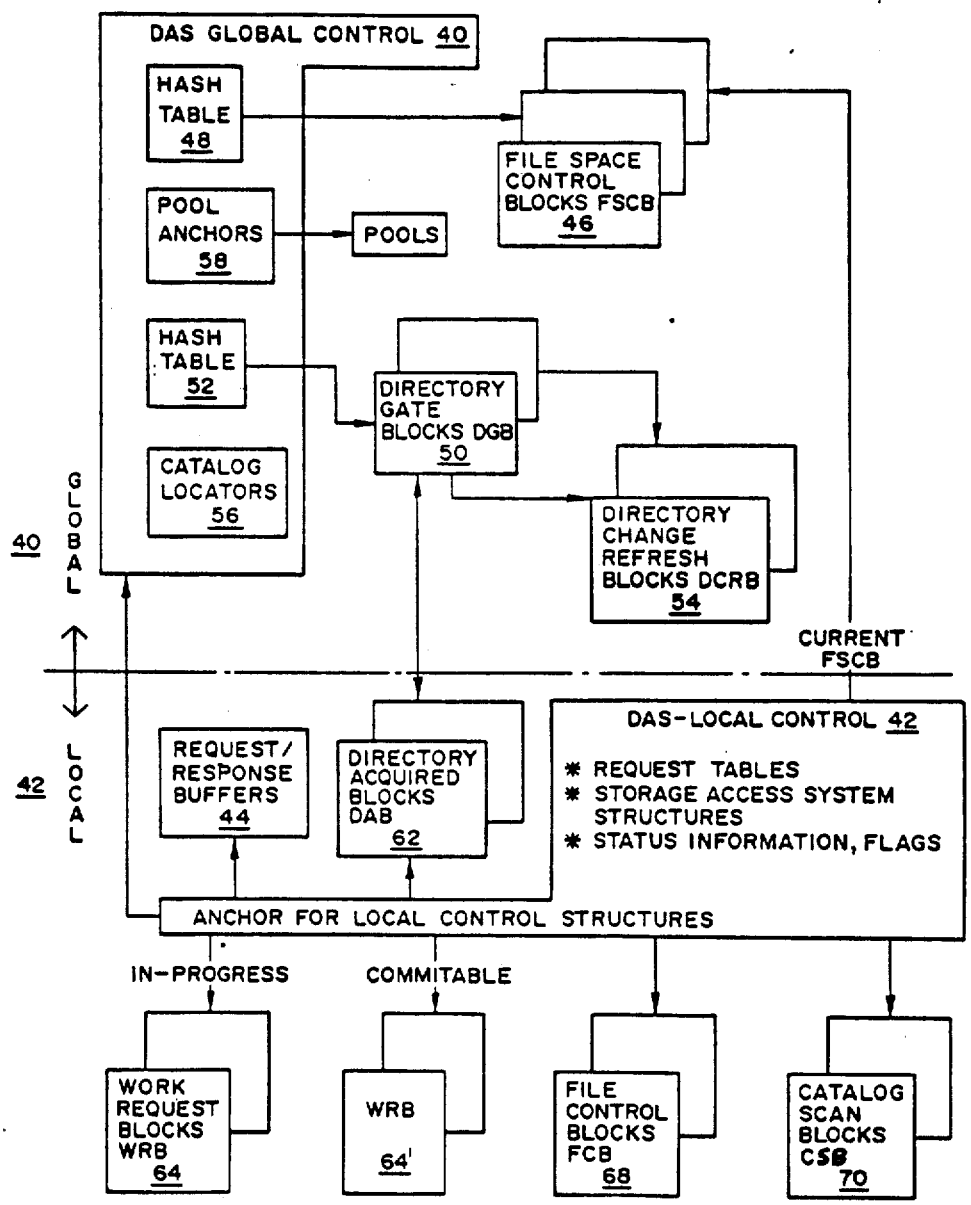
FIG.2 MAJOR DATA ACCESS SYSTEM CONTROL STRUCTURES

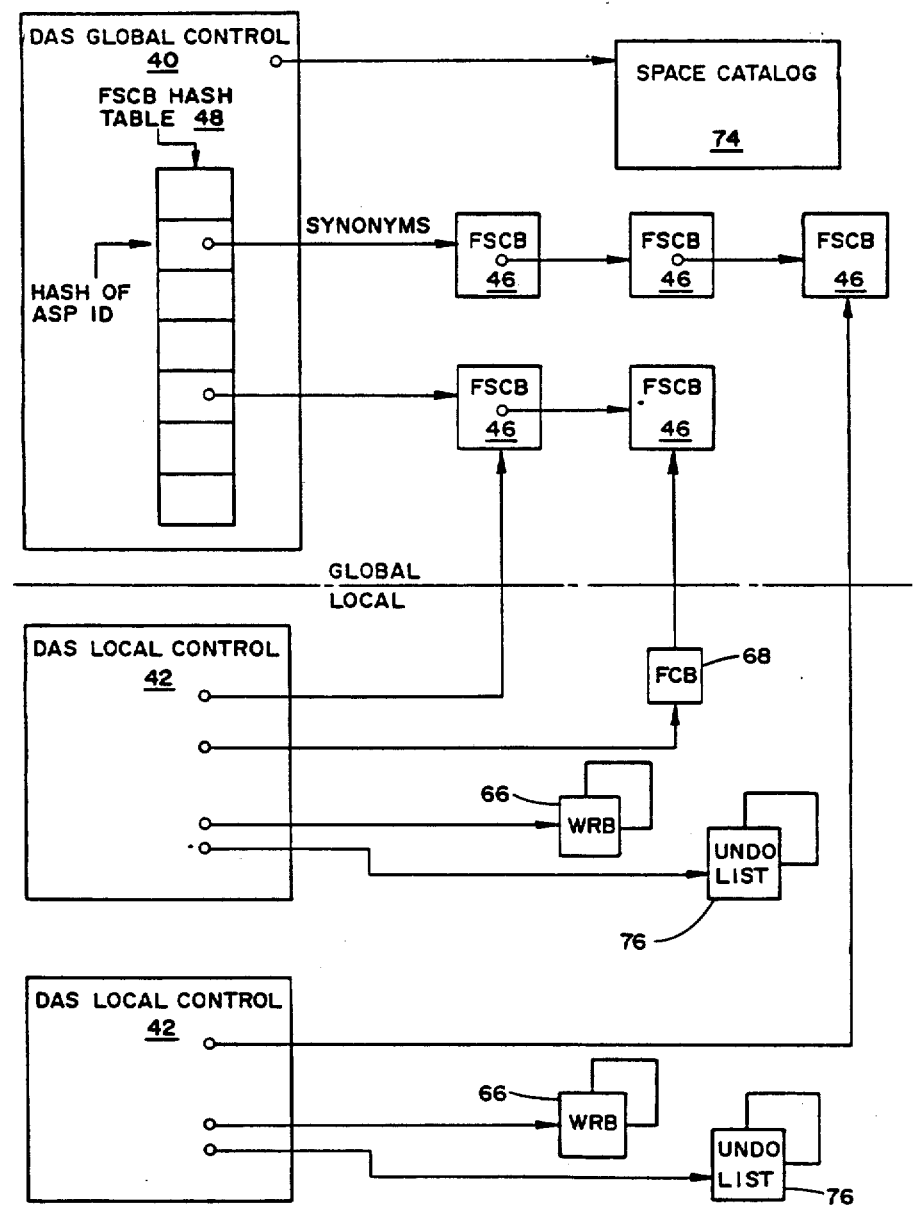
FIG.3 SPACE MANAGEMENT CONTROL STRUCTURES

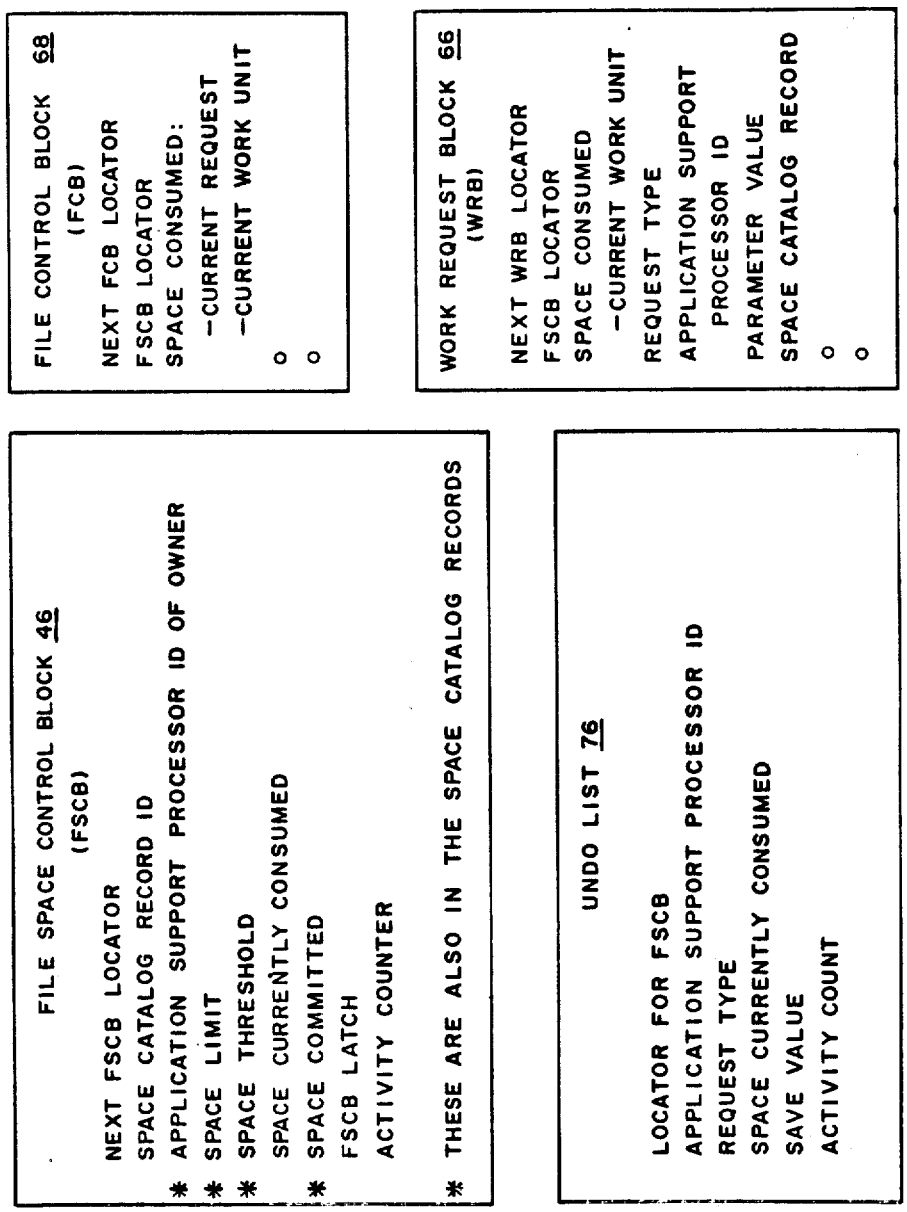
FIG. 4 CONTROL STRUCTURES UTILIZED BY SPACE MANAGEMENT

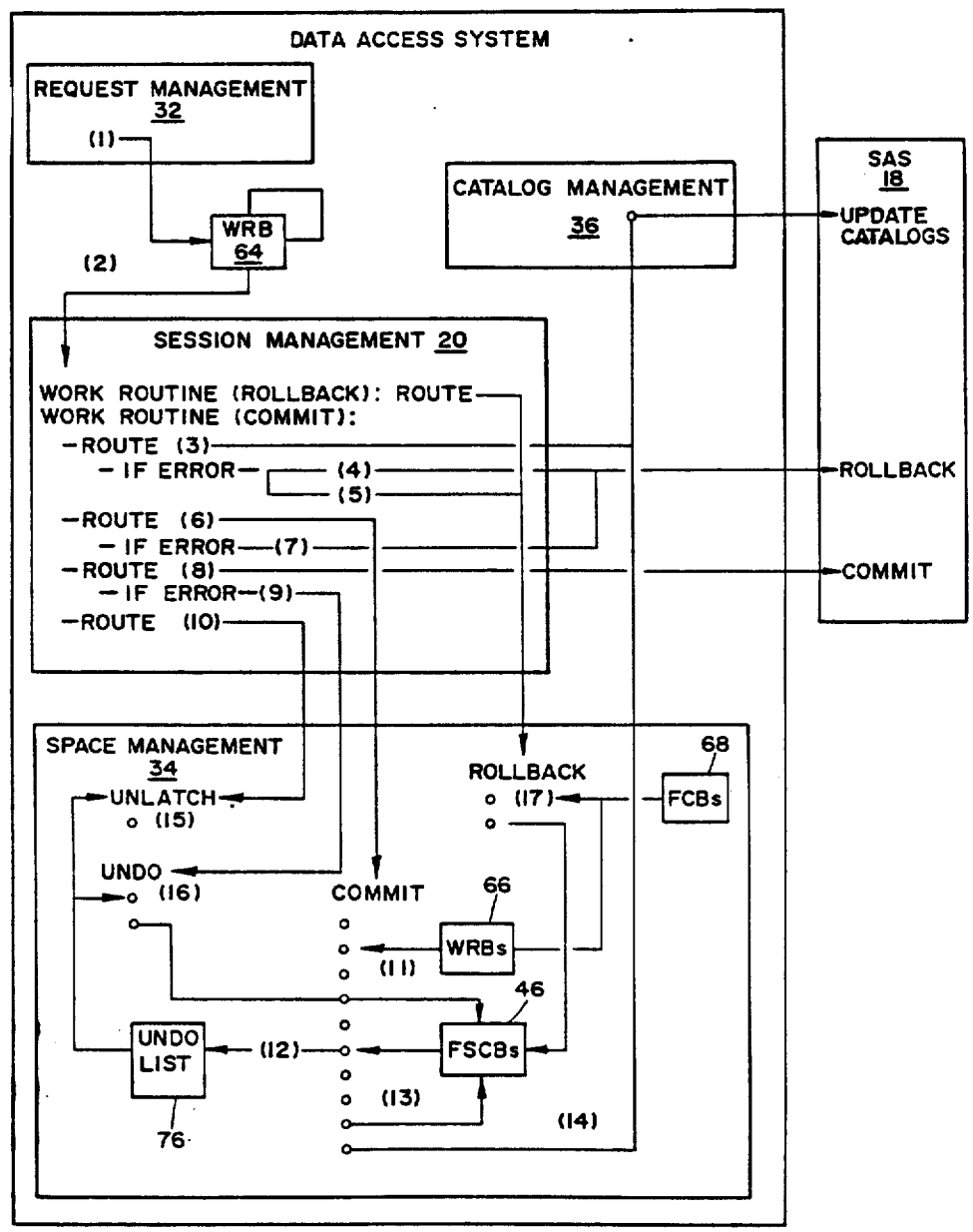
FIG.5 SPACE MANAGEMENT END OF WORK UNIT PROCESSING

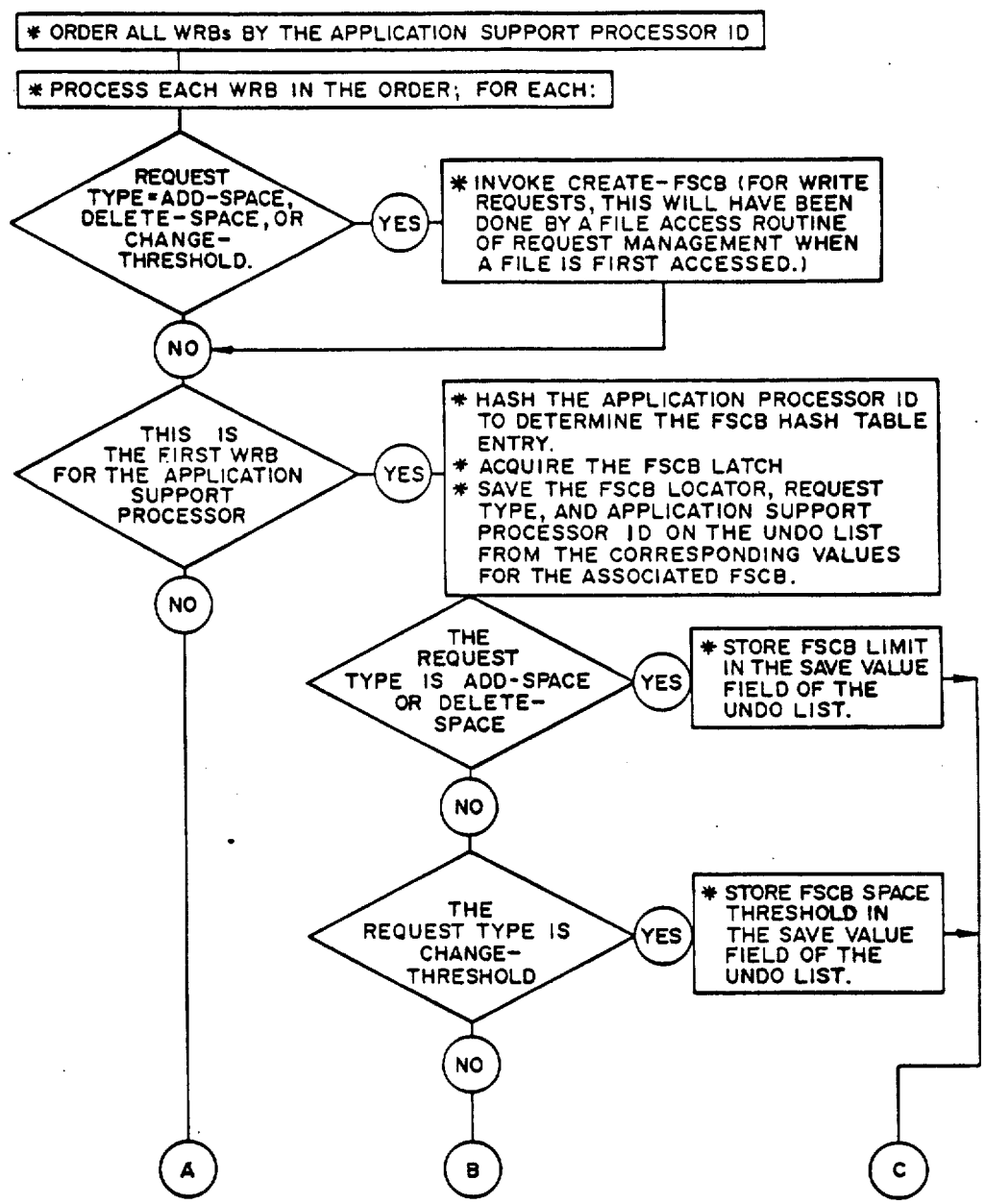
FIG.6 COMMIT OPERATION

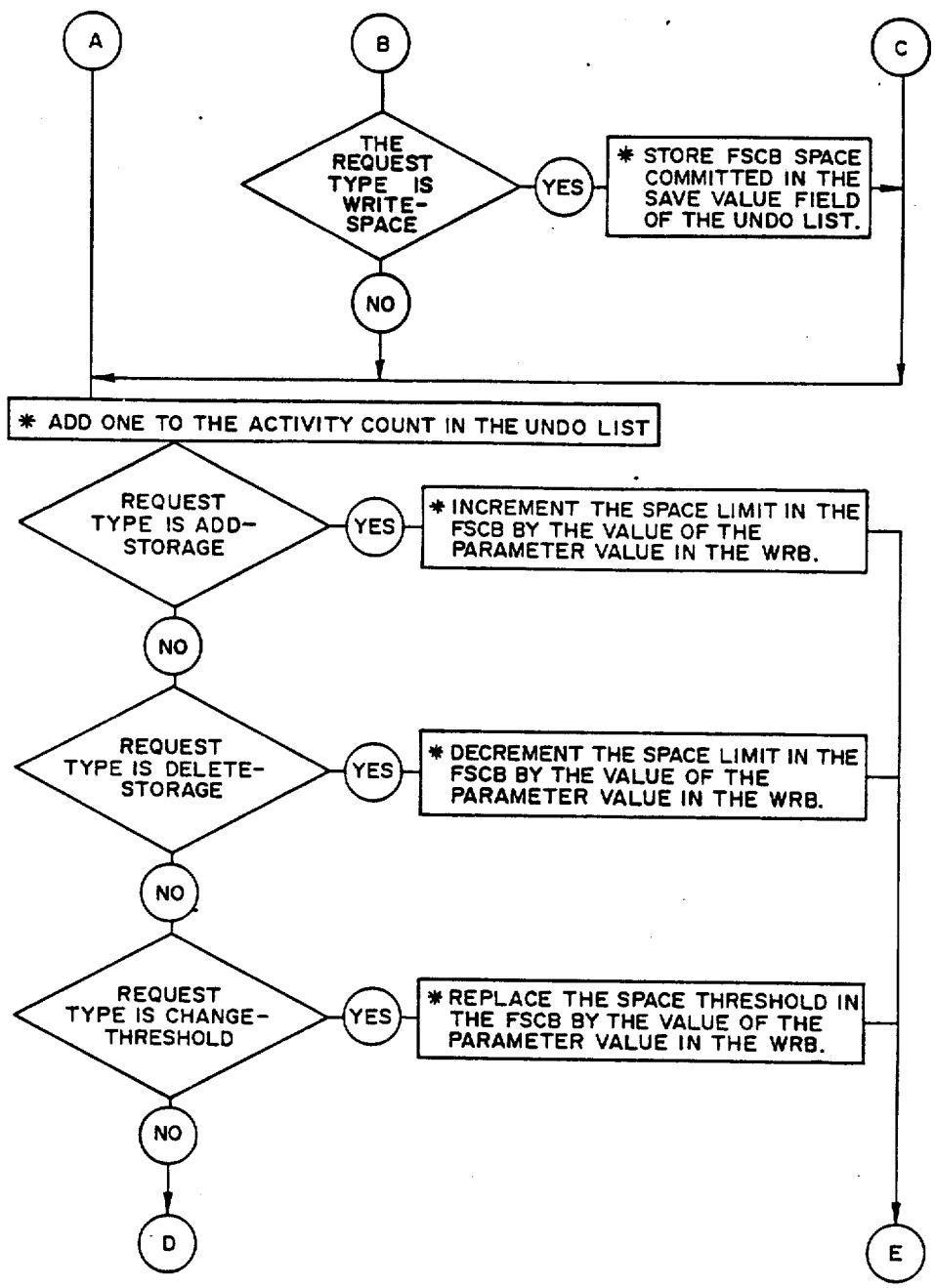
FIG. 7 COMMIT OPERATION

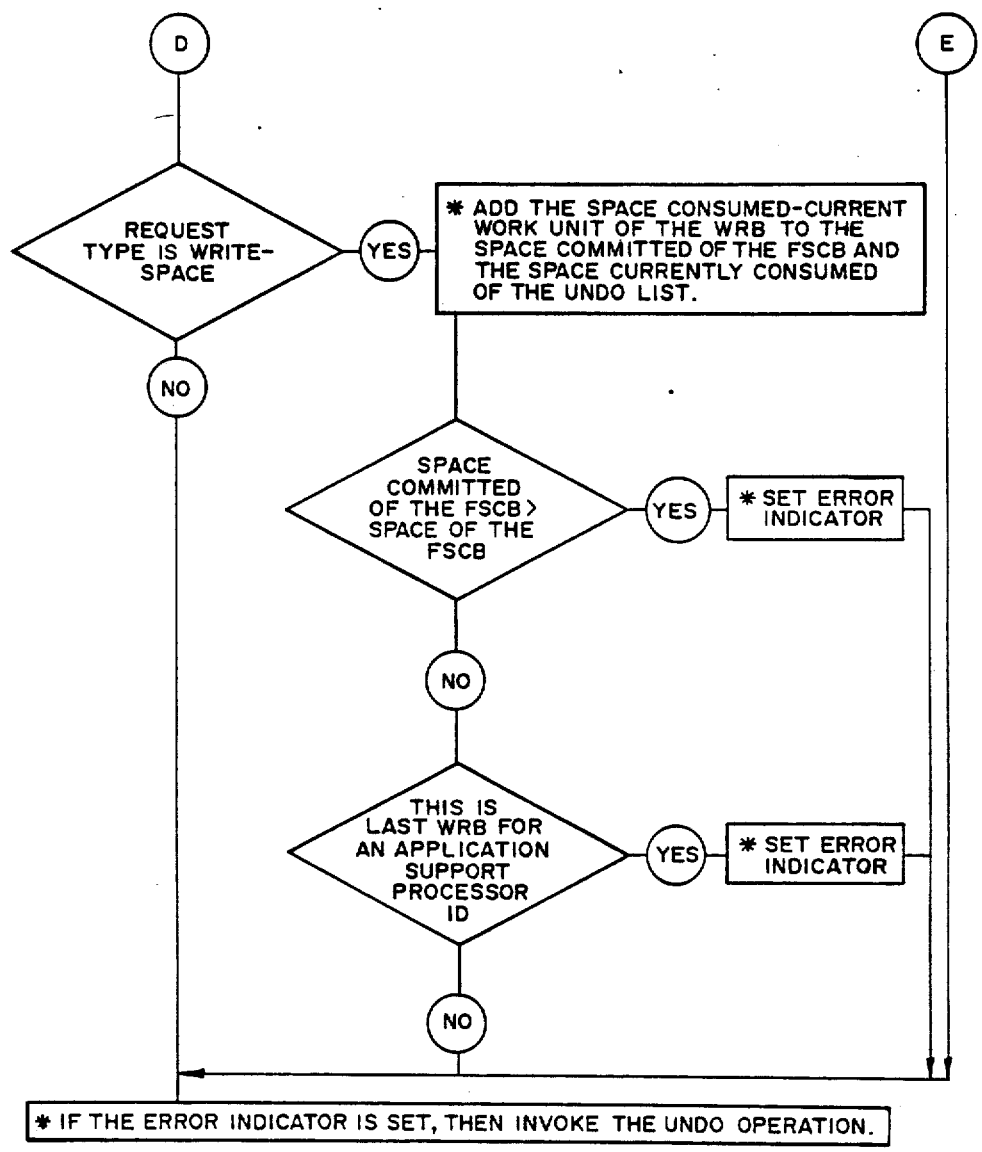
FIG.8 COMMIT OPERATION

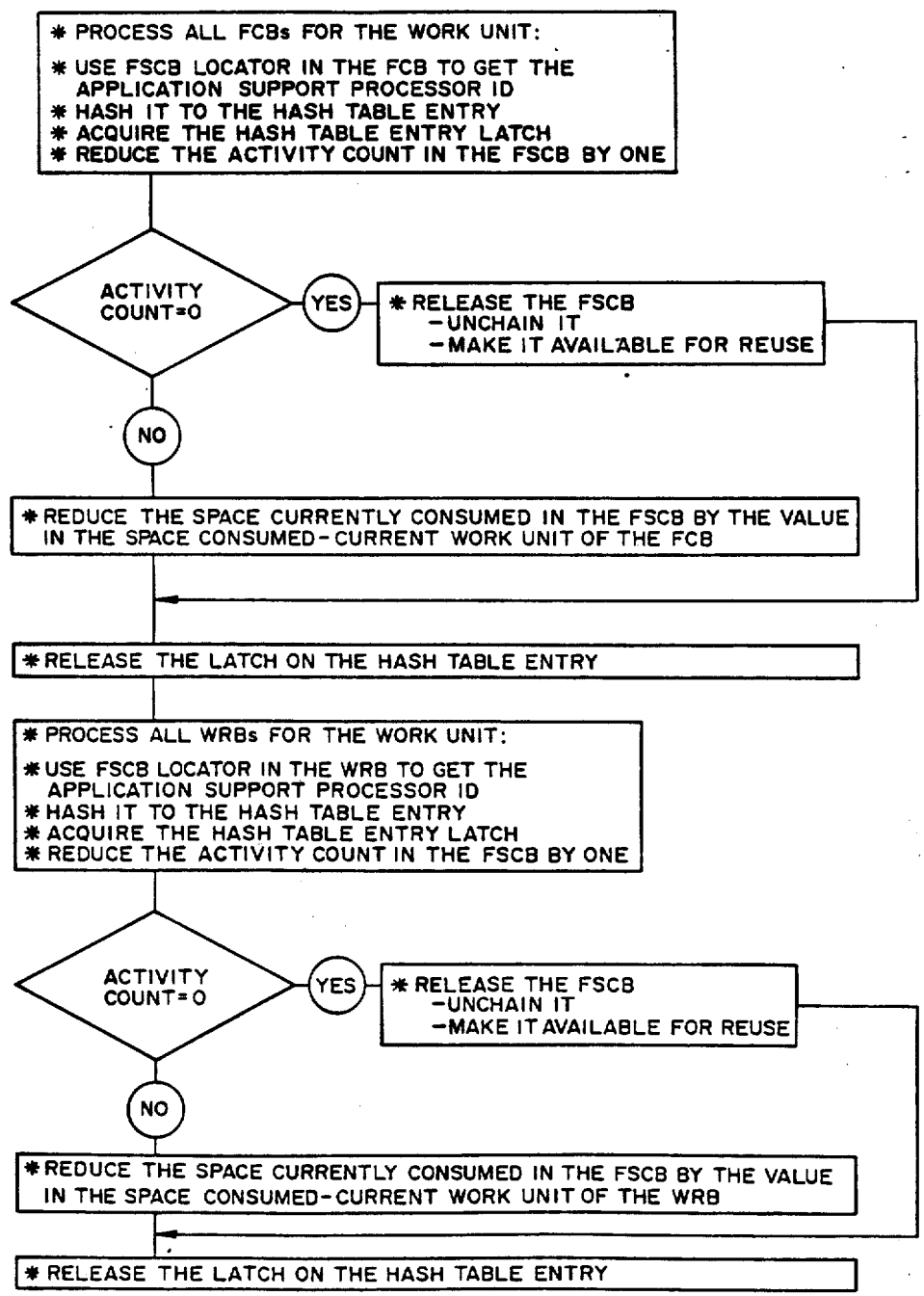
FIG.9 ROLLBACK OPERATION

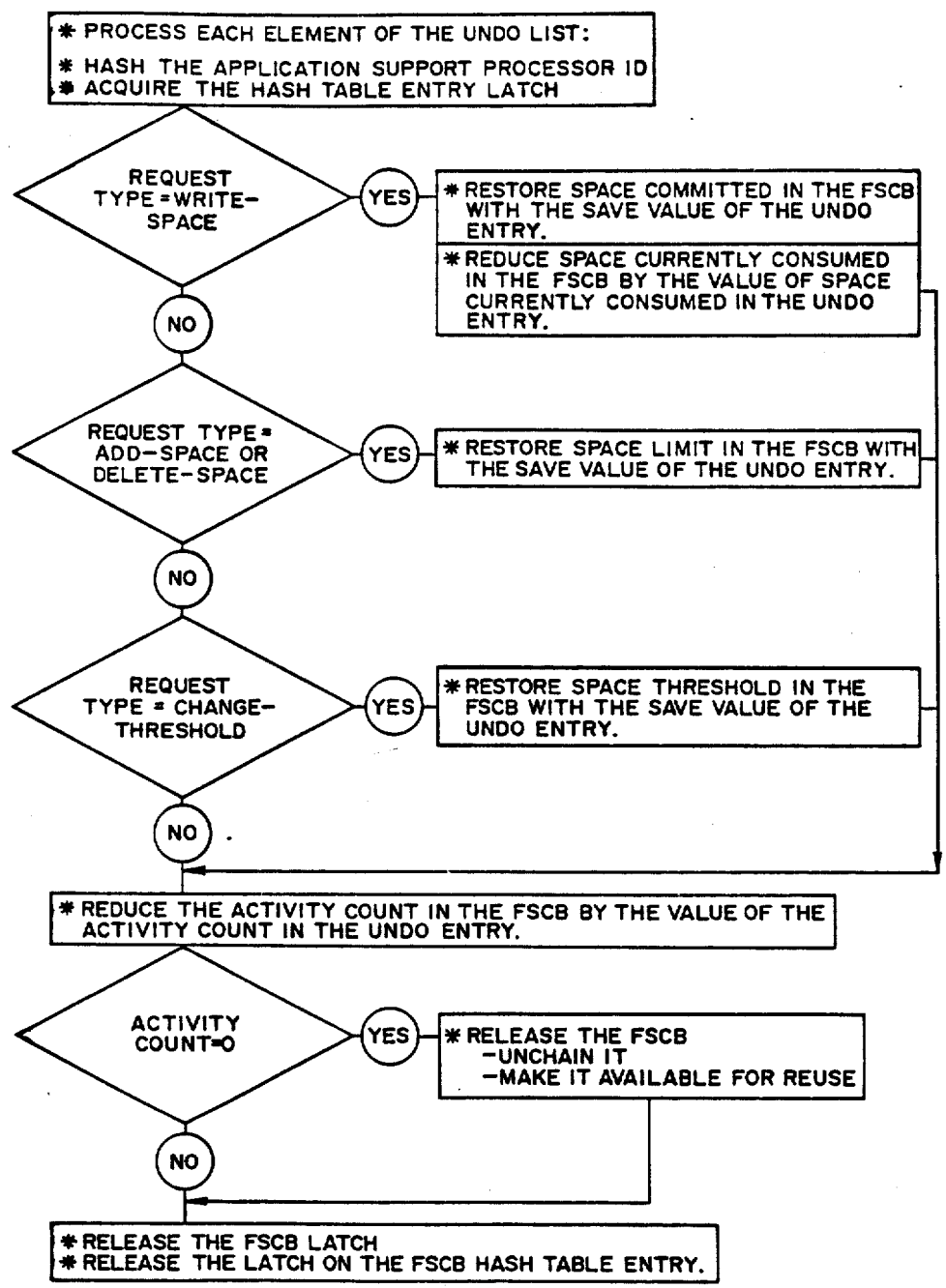
FIG.10 UNDO OPERATION

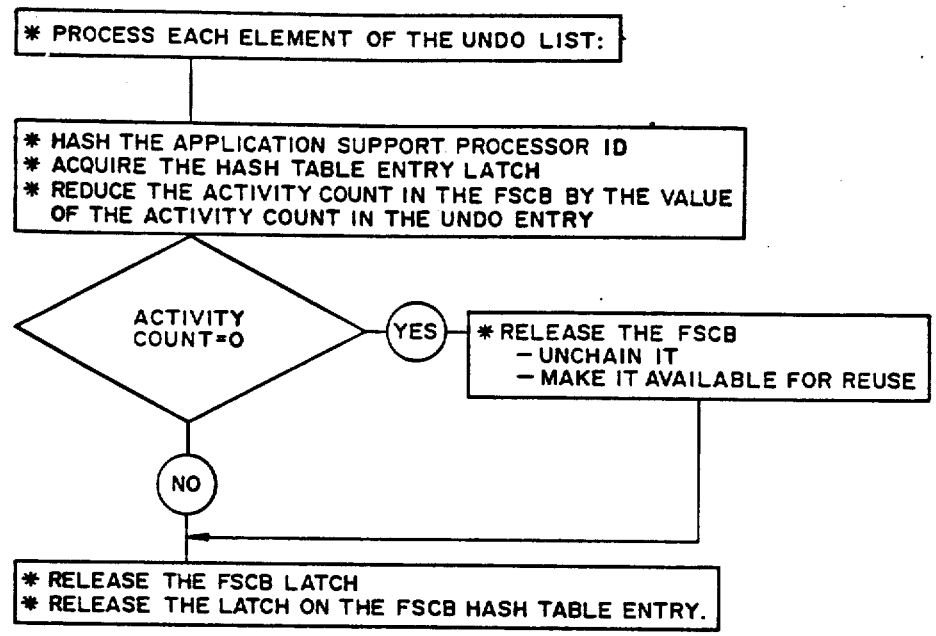
FIG.11 UNLATCH OPERATION

SPACE MANAGEMENT SYSTEM FOR DATA FILES HAVING SHARED ACCESS

BACKGROUND OF THE INVENTION

1. Field of the invention

The present invention relates generally to a Space Management System which forms a part of a Data Access System of a File Access Processor. A File Access Processor services requests from a set of Application Support Processors, which can exist in a global network, with each Application Support Processor sharing access to data in files stored by the File Access Processor. Application Support Processors may operate asynchronously, sharing the set of file resources managed by one or more File Access Processors. A File Access Processor manages access to a set of data files and information about files held in file directories therein. File directories allow for managing file collections, can relate to each other hierarchically, and may be shared. The File Access Processor also maintains therein a set of catalogs, which are repositories of information in the File Access Processor for its own internal use, and which are not available and accessible to Application Support Processors, as are the data files and directories. Each Application Support Processor also maintains therein an internal cache of file information to improve performance by reducing communications required with the File Access Processor for information about files. The File Access Processor provides the Application Support Processors with information for updating and maintenance of local caches of directory and file description information through a centralized accumulation and distribution of cache change notifications.

More particularly, the present invention relates to a Space Management System which manages file space assigned to each Application Support Processor and supports the space management functions of adding space, deleting space, setting thresholds for limit warnings, querying space, charging space used, warning notifications, crediting space freed, and permitting file spaces to be shared by more than one Application Support Processor.

2. Discussion of the Prior Art

For the discussion herein, the features of the present Data Access System are compared with features of two previous IBM systems, a SQL/DS system, and a VM Minidisk File System.

The SQL/DS system is based on a substantially different system design providing compiled access routines which are compiled and executed, as opposed to the present system which provides interpretive request routines which are specifically designed to accomplish particular functions.

The SQL/DS system does not provide for an internal cache of file information similar to the present invention.

Moreover, in the SQL/DS system changes by an updater become available to other users before the changes are committed. In the present system changes are not available to other Application Support Processors until the work unit is committed successfully. Each Application Support Processor retains the version of the file obtained when the file was initially accessed.

The SQL/DS system also does not provide for on-line data space management, and provides no warning as the SQL/DS equivalent of file space thresholds are approached. Dynamic changes to space limits are not provided, and the system can only provide for migration to new data base space. The SQL/DS system basically represents an entirely different approach to recognition of space limits based on different requirements. The SQL/DS system provides an immediate recognition when a consumption limit is reached, whereas DAS Space Management permits temporarily exceeding limits (until time of commit), such that only permanent space consumption is subject to enforced limits.

The VM Minidisk File System does not provide for sharing of files or for a hierarchical directory support. There is no provision for globally maintained cache information, and no provision for work units (requires keeping temporary copies of old versions of files for example). The VM Minidisk File System does not provide for sharing of data, and for support of separate caches.

The VM Minidisk File System also has no provision for space management similar to the present invention, and only provides for mini-disks (virtual disks implemented as contiguous segments of real disks). The system does not provide a capability for on-line administration of space (changes to available space, limits, etc.) Since space is directly associated with a contiguous storage assignment, an expansion requires a reassignment to another (larger) minidisk, and physical transfer of data files leading to delays, fragmentation of space, administrative burdens, etc. Moreover, the sharing of minidisks is haphazard and awkward. No concurrency controls are provided for synchronizing multiple writers (unpredictable results). After updates, readers must re-access the minidisk or risk unpredictable results (loss of data integrity). Moreover, no space thresholds are provided.

In the VM Minidisk File System access authorization is controlled at the minidisk level, whereas the present system controls access at the file level which provides greater granularity-finer control.

SUMMARY OF THE INVENTION

Accordingly, it is a primary object of the present invention to provide a Space Management System for a Data Access System of a File Access Processor as described hereinabove which manages file space assigned to each application support processor and supports the space management functions of adding space, deleting space, setting thresholds for limit warning, querying space, charging space used, warning notifications, crediting space freed, and permitting file spaces to be shared by more than one application support processor.

In accordance with the teachings herein, the present invention provides a Space Management System which is provided with access to a Space Catalog which records therein a record for each Application Support Processor representing logical file space that is assigned thereto. The Data Access System includes a Global Control structure which is maintained permanently for all activations of the Data Access System, and which anchors and provides a basis for locating File Space Control Blocks which maintain file space information in temporary storage, with each File Space Control Block being initially created from a Space Catalog record when a work unit is initiated for a particular Application Support Processor. Moreover, the Data Access System updates the record in the Space Catalog for the particular Application Support Processor when the work unit is finished and committed.

In accordance with further details herein, multiple Application Support Processors can consume space in a file space concurrently, and the Data Access System and Space Management System enforce and support a common set of space consumption limits and thresholds. Moreover, in the system, one Application Support Processor can authorize another Application Support Processor to share its file space. When an Application Support Processor initiates file space consumption in its own file space, the File Space Control Block created during activation initiation is utilized for space management. When file space consumption is in a file space owned by another Application Support Processor, the initiating Application Support Processor utilizes the file Space Control Block created during the activation of the owning Application Support Processor. Moreover, if the owner is not active, a File Space Control Block is created by the first non-owner that utilizes the file space.

It is an object of the Space Management System of the present invention to minimize the periods of non-concurrency for multiple Application Support Processors participating in updates to separate files in a file space. In this system write locks are utilized to prevent concurrent changes to the same file. However, concurrent changes to different files in a file space should be allowed except during the period of Space Catalog update and commit of a work unit. The Space Management System is designed to allow Space Catalog change coordination between contending Application Support Processors in such a manner as to maximize concurrency.

The Space Management System accomplishes these system objections by the sequence of operations at commit time. Initially, all catalogs are updated except the Space Catalog. Write locks exist on individual files, and are held until the commit is completed. A commit latch on an FSCB serializes commits of the Space Catalog changes. The FSCB latch is only held while doing the commit call to the Space Access System, thereby minimizing the period of non-concurrency for writers to a particular file space.

The basic sequence of operations at commit time is:
a. Update all catalogs except the Space Catalog.
b. Update the Space Catalog from FSCBs, latching the FSCBs.
c. Invoke the Space Access System to commit the catalog and file changes.
d. Release the FSCB latch.

This results in minimizing the period of non-concurrency for multiple Application Support Processors participating in updates to separate files in a file space.

In accordance with the details of a disclosed embodiment herein, the File Space Control block for an Application Support Processor includes fields for, SPACE LIMIT which is the total space permitted for files, SPACE THRESHOLD which is a percentage of the space limit, SPACE CURRENTLY CONSUMED which is updated for each file request that affects space consumption and is utilized to determine if the space threshold has been reached, SPACE COMMITED which is updated when the work unit is committed, and File Space Control Block LATCH which is used to synchronize changes to the space catalog.

Additionally, for controlling the release of a File Space Control Block, an activity counter is maintained in each File Space Control Block which is incremented by one for each activity initiated that involves a change in space consumption and decremented by one for each committed or terminated activity of that File Space Control Block. The File Space Control Block is finally released only when its activity counter goes to zero, which retains the File Space Control Block while it is expected to be reused or currently active.

In accordance with further details of the disclosed embodiment, the Data Access System also builds Local Control structures, one for each activation of the Data Access System by a particular Application Support Processor. The Local Control structure provides a basis for locating a File Control Block which is used to retain information about a particular file while it is being accessed by a local activation of an Application Support processor. The File Control Block has particular fields for space management, including a locator for the File Space Control Block that is set when the file access is initiated, and used for rapid reference to the File Space Control Block thereafter. In greater particularity, the File Control Block also includes fields for SPACE CONSUMED-CURRENT REQUEST which is the change in space consumption caused by the completion of the most recent request against the file represented by this File Control Block, and SPACE CONSUMED-CURRENT WORK UNIT which is the change in space consumption caused by all changes to the file represented by this File Control Block in the current work unit.

The global control structure also includes a File Space Control Block hash table by which a File Space Control Block of a particular Application Support Processor can be located.

Additionally, when a particular file access is completed successfully, a Work Request Block is built containing information required for updating File Space Control Blocks and the Space Catalog records. Information is transferred from the File Control Block to the Work Request Block, and then the File Control Block is released. The Work Request Blocks are used to retain information that is needed to update the Space Catalog for changes in space management information when the work unit is successfully completed and committed. A separate Work Request Block is provided for each record in each catalog that must be updated.

In greater detail, the Work Request Block includes fields for, SPACE CONSUMED-CURRENT WORK UNIT which is the change in space consumption caused by all changes to the file represented by this Work Request Block in the current work unit, REQUEST TYPE which is an encoding of the type of request that caused the Work Request Block generation, PARAMETER VALUE which is used to hold the new space limit or space threshold for add-space, delete-space, and change-threshold requests so that it is available for modifying the File Space Control Block and Space Catalog at commit time, and SPACE CATALOG RECORD which is a copy of the Space Catalog record read into this area in preparation for selectively updating it.

Moreover, the local control structure also provides a basis for locating UNDO Lists which are used to save the status of File Space Control Blocks at the beginning of the current work unit so that the File Space Control Blocks can be restored in the event of a failure in updating the Space Catalog during commit processing.

In accordance with the teachings herein, the Space Management System supports a technical approach which presents a clear separation of functions to permit high performance, allowing easy maintenance and extensibility, while supporting the required functions.

The control structures of the Data Access System support the following particular features of the design.

1. DAS Global Control anchor for all global control structures, one for all activations of the DAS.

2. DAS Local Control anchor for all DAS local control structures, one per activation of the DAS by an ASP.

3. Work Request Blocks (WRBs) support deferred updates of catalogs, space consumption values, and cache updates.

4. File Space Control Blocks (FSCBs) support dynamic threshold warnings and space consumption limits shared by all users of a file space.

5. Cache structures in support of the central cache maintenance capability.

The design of the Data Access System provides structures for the following.

1. Maintenance of local caches of directory and file description information through centralized accumulation and distribution of cache change notifications.

2. Permanent storage in the form of catalogs for retaining shared information about files, directories, and control information. A separate access method and storage facility is utilized for these catalogs from that utilized for file data, permitting flexibility in access to catalog information (access required only occasionally), while retaining high performance in the access to file data.

3. Permanent storage and retrieval of file data blocks.

4. Fast path processing for each request type through individual and separate request processing routines, deferred updates to catalogs, and judicious balancing of in-line with centralized services.

5. Services covering routing, response formulation and buffer management, catalog access, storage management, concurrency controls, etc. that are available for request handling routines, with minimal environmental switching (in-line or fast path).

6. Grouping requests into work units that can be subject to reversal (back-out of changes) in the event of a failure and control when a second writer to a common file can gain access.

7. Concurrent activations, each servicing a logical grouping of file requests (supports sharing).

8. Previewing of catalog changes whereby the originating Application Support Processor sees changes before they are committed (end of work unit), while other Application Support Processors do not have access to them until after the commit. This is made possible through deferred updates of catalogs and in-flight search of WRBs before catalog reads.

9. On-line file space management with consumption limits and thresholds whereby more than one ASP can concurrently consume space in the same file space and experience the same limits/thresholds. Also supports on-line administration (changes in limits, thresholds, new file space etc.).

The DAS Cache Management component is provided for maintaining local caches in each Application Support Processor which contain the current status of file information for cached directories. Cache Management utilizes a centralized collection of cache change information, along with facilities for recording and distributing the changes to the appropriate Access Support Processors, and includes:

1. A set of control structures for recording the information.

2. A set of functions for performing the required work.

3. Control flow descriptions, relating Cache Management with other components of DAS.

The DAS cache management design provides for data sharing and high performance, and more specifically:

1. Permits each Application Support Processor to see directory changes, even those made by others on a timely basis.

2. Concurrency controls required for the global control structures that are required to support the function.

3. Piggyback cache change notifications with normal responses.

4. Non-replicated centralized change records, Directory Change Refresh Blocks (DCRBs) minimize storage.

5. Deferred recording of changes until the successful end of a work unit.

The DAS Space Management component provides for support of on-line control of file space consumption limits in an environment where multiple ASPs can consume space in a repository (file space) concurrently, while enforcing and supporting a common set of space consumption limits and thresholds, and includes.

1. A set of control structures for recording the limits, thresholds, and other control information for each active file space.

2. A set of functions for performing the required work.

3. Control flow descriptions, relating Space Management with other components of DAS.

4. On-line setting and changes to consumption limits for individual file space.

5. On-line setting and changes to threshold levels for warnings.

6. Dynamic recording of space consumption (at commit time).

7. Dynamic reporting of threshold levels reached for each file write (hence the particular need for FSCBs).

8. Coordinated commit of Space Catalog changes with other work unit updates to catalogs etc. in such a way as to maximize concurrency.

9. Capability for backing out changes in a consistent manner in the event of a failure.

BRIEF DESCRIPTION OF THE DRAWINGS

The foregoing objects and advantages of the present invention for a Space Management System for a Data Access System of a File Access Processor may be more readily understood by one skilled in the art with reference to the following detailed description of a preferred embodiment thereof, taken in conjunction with the accompanying drawings wherein like elements are designated by identical reference numerals throughout the several views, and in which:

FIG. 1 illustrates the relationships between the major subcomponents of the Data Access System, as well as the relationships between it and the other two components of the File Access Processor, the Service System and the Storage Access System;

FIG. 2 shows the major control structures of the Data Access System;

FIG. 3 illustrates the set of control structures which are relevant to the Space Management Subcomponent;

FIG. 4 shows pertinent fields for Space Management in the FSCB, FCB, WRB, and UNDO List;

FIG. 5 illustrates the flow of control and data which occurs at the completion of a work unit (commit or rollback);

FIGS. 6, 7 and 8, when placed together with FIG. 6 on top, FIG. 7 in the middle, and FIG. 8 on the bottom, illustrate a logic flow diagram of the COMMIT operation supported by Space Management;

FIG. 9 illustrates a logic flow diagram of the ROLLBACK operation supported by Space Management;

FIG. 10 illustrates a logic flow diagram of the UNDO operation supported by Space Management; and FIG. 11 illustrates a logic flow diagram of the UNLATCH operation supported by Space Management.

DETAILED DESCRIPTION OF THE DRAWINGS

Referring to the drawings in detail, in FIG. 1 a Data Access System 14 is illustrated in terms of the functions of its subcomponents, the relationships between its subcomponents, and its relationships with other components of a File Access Processor 12.

The Data Access System 14 is described in copending U.S. patent application Ser. No. 393,094, filed Aug. 2, 1989 (a continuation of Ser. No. 110,370 filed Oct. 19, 1987) which is owned by the assignee of the subject application. The Data Access System 14 is one component of a File Access Processor 12, which also includes two other components, a Service System 16 and a Storage Access System 18, the functions of which are generally known in existing computer systems, and are not described in detail herein, but their basic functions are described briefly to establish perspective.

A File Access Processor 12 services requests from a set of Application Support Processors 10 which can exist in a global network, with each Application Support Processor 10 sharing access to data in files stored by the File Access Processor 12. Application Support Processors 10 may operate asynchronously, sharing the set of file resources managed by one or more File Access Processors 12. Each Application Support Processor 10 also maintains therein an internal cache of file information to improve performance by reducing communications with the File Access Processor 12 for information about files. The File Access Processor 12 provides the Application Support Processors 10 with information for updating this cache, and also responds to normal file access requests.

A File Access Processor 12 manages access to a set of data files and information about files held in file directories. File directories allow for managing file collections, relate to each other hierarchically, and may be shared. The File Access Processor also maintains therein a set of catalogs, which are repositories of internal information in the File Access Processor for its own internal use, and which are not available and accessible to Application Support Processors, as are the data files and directories. Some of the requests supported by the File Access Processor 12 are as follows:

OPEN, READ, WRITE and CLOSE for file access,
DELETE files,
COPY files,
GRANT and REVOKE authorization to files
CREATE and DELETE directories,
OPEN, READ and CLOSE for directory access,
RENAME files and directories,
RELOCATE files from one directory to another, and
ADMINISTER file storage for files.

The primary functions of the File Access Processor 12 components are as follows.

The Service System 16 provides environmentally dependent services for the processor 12, including the initial receipt of requests, forwarding requests for file access, and dispatching and activation of the Data Access System 14 of the present invention. These activations persist through a set of file requests that represent a recoverable unit of work (defined as a work unit herein), which is explicitly concluded by a commit or rollback request (back-out) or certain other implicit terminations.

The Data Access System 14 processes individual requests, and maintains a set of catalogs that contain control and descriptive information concerning the set of files managed by the File Access Processor 12. This information includes data file control, security, integrity, concurrency, inter-relationship, recovery, status, and control information. The Data Access System 14 also accumulates cache update information, representing changes to file descriptions and characteristics, that are forwarded to maintain current the data in the caches of the Application Support Processors.

The Storage Access System 18 manages the data blocks that comprise the data files—mapping them to external storage devices, the set of records that comprise the catalogs, the set of locks that permit concurrency, and the grouping of work items that represent recovery units. It maps access to physical data with minimal sensitivity to logical grouping or content. The Storage Access System 18 runs in the same activation as the Data Access System 14 that invokes it.

The Data Access System 14 Subcomponents have the following functions.

The Session Management Subcomponent 20 is at the hierarchical top of Data Access System 14 request processing. It receives requests through the Service System 16. It is the focal point of control and includes a set of fundamental services for response formulation. It determines which Request Management Subcomponent 32 routine should be invoked to service the request and passes control to it. At the end of request processing, control is passed back to the Session Management Subcomponent 20 to finish request processing and forward the requested response.

The Session Management Subcomponent provides the primary routing and control functions for the Data Access System. In addition, it manages work units, supports deferred commit of work, supports response buffer management and ordering, as well as initialization and termination of the Data Access System. A number of routines support the operation of Session Management. Some of these routines are also utilized by other subcomponents of the Data Access System as common services.

Following are some of the service routines included in the Session Management Subcomponent 20.

Start-up routine 22—to initialize Data Access System 14 control structures.

Storage Pool routine 24—to maintain and dispense working storage for control structures. The Pool Routine is a general Data Access System service for allocating and de-allocating control structures from large blocks of working storage. The routine supports allocating or deallocating single or multiple control structures of the same type (changed) with a single invocation.

Response routine 26—to assist Request Management Subcomponent 32 routines in the building of response messages, and to assemble the response and cache update information into a properly formatted response message. The Response routine has two aspects.

1. It supplies a Getbuffer Service used throughout the Data Access System for providing buffers that hold response information. For this service, it not only supplies the buffers, but also implicitly accounts for them, accumulating lists of buffers acquired in preparation for assembling the response for the current request.

2. It builds the response to the current request from several sources:

a. It invokes the Cache Management RETRIEVE routine for finding all of the Cache Notification Records (CNRs) and placing them in buffers supplied by the Response Routine.

b. It builds a locator list of buffers consisting of the CNR buffers, buffers allocated by the Getbuffer Service, and standard request diagnostic information. This locator list is sent to the Service System for return of the response to the requesting Application Support Processor.

Work routine 28—to coordinate and initiate processing required when a logical group of requests are "committed" or "rolled back", i.e. manage activities at designated points of recovery (termination of a work unit). The Work routine 28 supports the commit and rollback explicit requests as well as implicit commit and rollback conditions. For explicit requests, the Work routine 28 is invoked through the Request Management Subcomponent 32. To maintain consistency and integrity, actual catalog updates are deferred until the successful completion of the work unit. The Work routine 28 invokes:

a. the Catalog Management Subcomponent 36 to accomplish catalog updates based upon WRBs (Work Request Blocks) built by Request Management Subcomponent 32 routines.

b. the Space Managment Subcomponent 34 to coordinate the update of the Space Catalog based upon WRBs built by Request Management 32 routines.

c. the Storage Access System 18 to commit changes to file blocks and catalogs.

d. the Cache Management Subcomponent 38 to store cache notification information (also contained in Work Request Blocks built by the Request Management Subcomponent 32 routines).

Terminate routine 30—to clean up control structures at the conclusion of an activation of the Data Access System 14. The Terminate Routine manages the clean-up of storage and control structures when service to a particular Application Support Processor is ended. Terminations occur from implicit failures (communications between an Application Support Processor and a File Access Processor, deadlock on resources, etc.) and explicit actions (system operator forced, Application Support Processor ended, etc.). Terminations are discovered upon initial entry into Session Management or at any other point when an activation of the Data Access System regains control after an invocation of either the Service System or the Storage Access System. Therefore the Terminate Routine is a service that is invoked from many places in the Data Access System where other File Access Processor components are invoked.

WRB Condense routine 31 supports reduction of multiple changes to the same catalog entry into a single change. The Data Access System utilizes several catalogs for managing file and directory information. Each entry in the Object Catalog, for example, contains descriptive and control information about a particular file. Work Request Blocks (WRBs) are used to save catalog change information from the time of file request processing until the time that the work unit is committed. When multiple WRBs exist for the same catalog entry, they are condensed into a single WRB. This is important for two reasons:

a. Reduction of the number of catalog update operations (performance).

b. Support of a special Catalog Management routine called "In-flight Retrieval". When an Application Support Processor request requires retrieval of a particular catalog entry, the In-flight Retrieval routine of Catalog Management is first called upon to search through the chain of commitable WRBs for the current work unit to determine if there is a WRB for the requested catalog entry. If there is, the WRB will contain complete information for that entry, including changes incurred by the current work unit. When a WRB is found, it is used to satisfy the retrieval request in lieu of retrieving the actual catalog entry. This permits processes in the current work unit to always see current work unit catalog changes before they are committed (written in to the catalogs) and made available to other Application Support Processors. This is essential for contextual processing within a work unit. In order for In-flight Retrieval to support return of a single catalog entry image, all changes to that catalog entry must have been condensed to a single WRB.

The Request Management Subcomponent 32 includes routines, illustrated as R1 through R9—although typically totaling thirty to forty routines. It utilizes the Catalog Management Subcomponent 36 to access catalogs, the Space Management Subcomponent 34 to manage logical space, and the Cache Management Subcomponent 38 for cache control processing.

The Request Management Subcomponent 32 builds and WRBs (Work Request Blocks) which go to the Work routine 28 at commit time (successful completion of a work unit) to drive catalog and cache updates.

The Request Management Subcomponent 32 utilizes the Storage Access System 18 directly to engage or disengage one or more logical locks that represent commitments against files and catalogs. It also invokes the Storage Access System 18 to add, delete, and update data blocks associated with particular files according to the requirements of the current request.

The Catalog Management Subcomponent 36 builds the control structures required for invoking the Storage Access System 18 to access the set of catalogs that the Data Access System 14 utilizes for control information for its set of files. Following are the catalogs managed by the Catalog Management Subcomponent 36:

a. Directory Catalog—each entry describes a named directory which is a collection of files.

b. Object Catalog—contains an entry for each file, alias (alternate access to a file), and directory. Entries include names, hierarchical relationships (for directories), containing directory, authorization, owner, status, file characteristics, and a list of data block identifiers that are used to access the actual data for the file.

c. Authorization Catalog—contains Application Support Processor 10 authorizations for files and directories.

d. Space Catalog—contains file space consumption limitations (number of file blocks) for each Application Support Processor 10.

e. Lock Catalog—contains information about locks that carry over past the end of an Application Support Processor 10 processing session.

When requested to retrieve catalog information, the Catalog Management Subcomponent 36 first searches for possible changes made by the current work unit, but not yet written into the catalogs. This is done by searching the Work Request Blocks that represent changes that have not been committed until the end of the work unit.

The Space Management Subcomponent 34 manages the logical space for an Application Support Processor 10 represented by a FSCB (File Space Control Block), a local representation of the Space Catalog entry for the Application Support Processor 10. Requests that affect logical space consumption due to changes in the storage consumed by files accomplish space accounting through the Space Management Subcomponent 34.

The Space Management Subcomponent 34 uses the Catalog Management Subcomponent 36 to access the Space Catalog.

The Cache Management Subcomponent 38 is invoked by the Work routine 28 of the Session Management Subcomponent 20 at the successful completion of a work unit (commit) to update the cached data maintained by the Data Access System 14, using information in Work Request Blocks (WRBs) built by the Request Management Subcomponent 32 to establish which directories are to be supported in the cache for the current Application Support Processor 10.

The Cache Management System 38 is described and disclosed in further detail in copending patent application Ser. No. 110,461 filed Oct. 19, 1987 which is owned by the assignee of the subject application. The purpose of the Cache Management System 38 is to collect a set (cache) of directory change information, representing updates to file descriptions and characteristics, and periodically distribute them to Application Support Processors for updating of their local caches. These caches improve performance by reducing the occasion for going to a File Access Processor for file information.

Application Support Processors permit files to be grouped in directories. A cache is kept for a particular directory whenever the Application Support Processor "acquires" the directory. In connection with acquiring a directory, the Application Support Processor requests all information about the directory and its files from the File access Processor. This information is used to initially load the Application Support Processor's local cache. Concurrently, the File Access Processor is notified that the Application Support Processor requires notification of all future changes that affect that directory. This change notification continues until the directory is explicitly "released".

Information for updating the local cache of the Application Support Processors accompanies (piggybacks on) normal response information that is returned from Application Support Processor requests. Information for updating the cache includes such things as file names, file lengths, file status, and authorization. The cache change information appears in individual records called Cache Notification Records (CNRs).

In order to manage cache notification information for Application Support Processors, the Data Access System must support the following functions:

1. Record which directories have been acquired by particular Application Support Processors (Cache Management ACQUIRE operation).

2. Recognize changes in directory and file descriptions that affect the cache.

3. Record the directory changes and accumulate the change information until the appropriate time for sending it to the interested Application Support Processors for updating their local caches.

4. Send the change information (CNRs) to the interested Application Support Processors.

5. Remove change information that all interested Application Support Processors have received.

6. Release directories that Application Support Processor have previously "acquired", but no longer require.

The Request Management Subcomponent 32 of the Data Access System supports the Cache Management functions in the following respects.

1. Processes individual requests from the Application Support Processors, and recognizes particular requests that cause a directory to be acquired (begin to receive cache notifications) and invokes Cache Management to put that Application Support Processor on the list of those to be notified for changes to that directory.

2. Recognizes particular requests that cause change to the cache. Generally, these correspond to requests that also cause changes to the following system catalogs, Directory Catalog, Object Catalog, and Authorization Catalog.

3. Builds a Work Request Block (WRB) for each catalog change and adds to it additional information for Cache Management where cache notification is also required. The Work Request Blocks are used to hold this information until the end of the group of requests that comprise a work unit, whereupon the catalogs are updated and Cache Management is called upon to accumulate and store the cache notification information.

FIG. 2 illustrates the major control structures of the Data Access System 14, and the following is a description of these major control structures.

One Data Access System (DAS) Global Control structure 40 is provided on a permanent basis for the Data Access System 14. It is the anchor for global control structures, those that are shared by all activations of the Data Access System 14. Since its associated control structures are shared in a multiprocessing environment, appropriate latches associated with each set of structures are provided for controlling concurrent access by participating activations.

A separate Data Access System (DAS) Local Control structure 42 is created for each activation of the Data Access System 14. The Local structure 42 is the basis for controlling the processing of the current request or set of requests from an Application Support Processor 10. It is the anchor for the Request Buffer 44 that is provided by the Service System 16 Processor, as well as response information built by one of the Request Management Subcomponent 32 routines. It also contains status information for request processing, and is the anchor for other control structures that are required to transfer control data between the subcomponents of the Data Access System 14 and with the Storage Access System 18. A DAS Local structure 42 and its parts are created and are maintained only to the end of the current work unit, i.e. for the set of requests serviced by the current activation. At the completion of the work unit, the work is either committed or rolled back.

The following are the primary control structures associated with the DAS Global structure.

File Space Control Blocks 46 (FSCBs) are used to do space accounting for a particular Application Support Processor 10. It provides limits and warning thresholds for the number of data blocks that may be consumed by the associated Application Support Processor 10. A File Space Control Block 46 is built from a Space Catalog entry, and is the basis for updating the Space Catalog when the work unit is committed. File Space Control Blocks 46 are accessed through a Hash Table 48 utilizing a unique identifier for each Application Support Processor 10. File Space Control Blocks 46 are managed by the Space Management Subcomponent 34.

Directory Gate Blocks 50 (DGBs) are used to define directories that are currently maintained in the cache. Each Directory Gate Block 50 represents a cached directory, and is the anchor for change information about files in the directory. Directory Gate Blocks 50 are accessed through a Hash Table 52 hashing on a unique directory identifier. Directory Gate Blocks 50 are managed by the Cache Management Subcomponent 38.

Directory Change Refresh Blocks 54 (DCRBs) record the actual change information about files in a directory. They are used by all Data Access System 14 activations that have the associated directory cached for notifying respective Application Support Processors 10 of the changes. Directory Change Refresh Blocks 54 are managed by the Cache Management Subcomponent 38.

Catalog Locators 56 are used by each Data Access System 14 activation to identify the catalogs when invoking the Storage Access System 18 for catalog access through the Catalog Management Subcomponent 36.

Storage Pool Anchors 58 are maintained for each type of storage pool 60, and provide a basis for fast access to unused storage blocks that may be allocated to a Data Access System 14 activation. Storage pools exist for each major type of control structure in the Data Access System 14. The storage blocks are used to build new control structures. The storage pools 60 are managed by the Storage Pool routine 24 of the Session Management Subcomponent 20.

The major control structures associated with each DAS Local structure 42 are as follows.

Directory Acquired Blocks 62 (DABs) represent each directory that a particular Application Support Processor 10 has acquired for cache purposes. They are managed by the Cache Management Subcomponent 38.

Work Request Blocks 64 (WRBs) are used to retain control information concerning a particular request. The information is used for the following:
a. Holding information read from catalogs,
b. Holding catalog change information until catalogs are updated at the end of a work unit,
c. Saving information for updating the cache at the conclusion of the work unit,
d. Backout processing when the current request processing fails,
e. Searching for changes to catalogs that have not yet been written into the catalogs.

Two chains of Work Request Blocks are used: In-process Chain 64—represents Work Request Blocks that are associated with processing the current request. Committable Chain 64-represents Work Request Blocks from previously completed, but uncommitted requests.

Work Request Blocks 64 are built by Request Management Subcomponent 32 routines and are utilized by the Catalog Management Subcomponent 36, the Space Management Subcomponent 34 and the Cache Management Subcomponent 38.

File Control Blocks 68 (FCBs) are used to retain information about open files. Application Support Processors 10 have available requests that can open files, retrieve information in them, and close them when completed. FSBs are used by some Request Management Subcomponent 32 routines.

Catalog Scan Blocks 70 (CSBs) contain information needed to process a catalog retrieval scan. A CSB 70 is retained until the scan is closed. They are managed by the Catalog Management Subcomponent 36.

SPACE MANAGEMENT SYSTEM

The purpose of Space Management System of the present invention is to manage file space assigned to each Application Support Processor, supporting the space management functions: adding space, deleting space, setting thresholds for limit warnings, querying space, charging space used, warning notifications, crediting space freed, and permitting file spaces to be shared by more than one Application Support Processor. The significant design characteristics include:

a. On-line administration of file spaces.

b. Capability for sharing file space between multiple concurrent Application Support Processors. The Space Management System allows Space Catalog change coordination between contending Application Support Processors in such a manner as to maximize concurrency.

Capability for on-line query of file space status as of the last completed work unit without requiring a separate utility function. File space is assigned to Application Support.

Processors 10 by those authorized as administrators. It is consumed as files are created or expanded and reduced as they are deleted or contracted.

Space management information is permanently recorded in the Space Catalog 74, FIG. 3, which contains a record for each Application Support Processor 10. This record represents a logical file space that is assigned to each Application Support Processor. This record is updated when committing a work unit that impacts the file space. When a work unit is in progress, file space management information is kept in non-permanent storage in a File Space Control Block 46 (FSCB).

An FSCB 46 is initially built from a Space Catalog record when a work unit is begun for an Application Support Processor. A local activation of the Data Access System is initiated to service the requests of the Application Support Processor for File Access Processor 12 work. Since an Application Support Processor may authorize another Application Support Processor to share its file space, the FSCBs that represents file spaces are global to, and potentially shared by, Data Access System activations. If the owning Application Support Processor is not active, FSCB creation may also be initiated by a sharing Application Support Processor when it initiates space consumption activity for the shared file space. When an Application Support Processor initiates file space consumption:

a. in its own file space, the FSCB created during activation initiation is utilized for space management; and b. in a file space owned by another Application Support Processor, it utilizes the FSCB created during the activation of the owning Application Support Processor. If the owner is not active, an FSCB is created by the first non-owner that utilizes the file space.

FIG. 3 illustrates the set of control structures that are relevant to Space Management.

FSCBs 46 are anchored to, and may be located from, FSCB Hash Table 48 entries. The FSCB Hash Table is located in the Global Control structure 40. The Hash Table Entry is determined from a hashing algorithm applied to the owning Application Support Processor ID. The set of synonym FSCBs (assigned to the same data location) represented by collisions in hashing are chained from the associated FSCB Hash Table Entry.

An FSCB may also be found through a locator from the owning Application Support Processor's DAS Local Control 42 where the locator is stored during initialization of the DAS activation.

Logically, an FSCB is no longer needed after a work unit is committed and it has been used to update the Space Catalog record. However:

a. it is more efficient to avoid releasing it when there is a good possibility that it will be needed again by another work unit. Such is the case when the owner commits its work unit; and b. it is necessary to avoid releasing it when there exists an active work unit initiated by a sharing Application Support Processor.

To support these conditions, an Activity Counter is maintained in each FSCB, see FIG. 4. The Activity Counter is incremented by one for each activity initiated that involves the FSCB (change in space consumption) and decremented by one for each committed or terminated activity. The FSCB is released only when its Activity Counter goes to zero. The Activity Counter is incremented when the FSCB is created for the initiation of the owning Application Support Processor's Data Access System activation and decremented when it terminates. It is also incremented when each new file is created or accessed for writing, then decremented when the file activity is committed or terminated. This retains the FSCBs while they are expected to be reused or currently active.

File Control Block (FCB) 68 is used to retain information about a particular file while it is being accessed by a local activation of an Application Support Processor. It has some particular fields for Space Management, including a locator for the FSCB that is set when the file access is initiated and used for rapid reference to the FSCB thereafter.

When a particular file access is completed successfully, a Work Request Block (WRB) 64 is built. Certain information is transferred from the File Control Block 68 to the Work Request Block 64, and then the File Control Block is released. Work Request Blocks are used to retain information that is needed to update the Object Catalog (changes in file information) and the Space Catalog (changes in space management information) when the work unit is successfully completed (committed). A separate WRB 64 is provided for each record in each catalog that must be updated.

UNDO Lists 76 are used to save the status of FSCBs at the beginning of the current work unit so that they can be restored in the event of a failure in updating the Space Catalog 74 during commit processing.

FIG. 4 shows pertinent fields for space management in the FSCB 46, FCB 68, WRB 64, and UNDO List 76.

The following are FSCB 46 fields not yet discussed:

a. SPACE LIMIT is the total space permitted for files. This is checked when consumption is committed. The commit fails if the limit is exceeded. It is incremented by the ADD-SPACE request and decremented by the DELETE-SPACE request.

b. SPACE THRESHOLD is a percentage of the SPACE LIMIT. It is checked by each file request that affects space consumption for potential generation of a warning for the accessing Application Support Processor. It is changed by the CHANGE-THRESHOLD request.

c. SPACE CURRENTLY CONSUMED is updated for each file request that affects space consumption and is utilized to determine if the SPACE THRESHOLD has been reached.

d. SPACE COMMITTED is updated when the work unit is committed by applying the SPACE CONSUMED-CURRENT WORK UNIT from each WRB 64 that participated in the work unit.

e. FSCB LATCH is used to synchronize changes to the Space Catalog.

The following are pertinent fields in the FCB 68.

a. SPACE CONSUMED-CURRENT REQUEST is the change in space consumption caused by the completion of the most recent request against the file represented by this FCB.

b. SPACE CONSUMED-CURRENT WORK UNIT is the change in space consumption caused by all changes to the file represented by this FCB in the current work unit.

The following are pertinent fields in the WRB 66.

a. SPACE CONSUMED-CURRENT WORK UNIT is the change in space consumption caused by all changes to the file represented by this WRB in the current work unit.

b. REQUEST TYPE is an encoding of the type of request that caused the WRB generation. It is set by the REQUEST MANAGEMENT routine depending on the type of request that is processed (ADD-SPACE, DELETE-SPACE, CHANGE-THRESHOLD, or WRITE-SPACE).

c. PARAMETER VALUE is used to hold the new SPACE LIMIT or SPACE THRESHOLD for ADD-SPACE, DELETE-SPACE, and CHANGE-THRESHOLD requests so that it is available for modifying the FSCB and Space Catalog at commit time.

d. SPACE CATALOG RECORD is an image of the Space Catalog record. It is read into this area in preparation for selectively updating it.

The following are pertinent fields in the UNDO List 76.

a. REQUEST TYPE is the type of request that caused the commit processing b. SPACE CURRENTLY CONSUMED is he accumulated value of all SPACE-WRITE consumption for the associated FSCB for the current work unit.

c. SAVE VALUE is the value of SPACE LIMIT (for ADD-SPACE or DELETE-SPACE), SPACE THRESHOLD (for CHANGE-THRESHOLD) or SPACE COMMITTED (for SPACE-WRITE) in the FSCB before applying the changes associated with the current work unit.

d. ACTIVITY COUNT is the total changes to the ACTIVITY COUNT for the associated FSCB due to the changes applied for the current work unit.

FIG. 5 illustrates the flow of control and data that occurs at the completion of a work unit (commit or rollback).

The Space Management System of the present invention is designed to minimize the periods of non-concurrency for multiple Application Support Processor participating in updates to separate files in a file space. In this system write locks are utilized to prevent concurrent changes to the same file. However, concurrent changes to different files in a file space are allowed except during the period of Space Catalog update and commit of a work unit. The Space Management System is designed to allow Space Catalog change coordination between contending Application Support Processors in such a manner as to maximize concurrency.

The Space Management System accomplishes these system objectives by the sequence of operations at commit time as illustrated in FIG. 5. Initially, all catalogs are updated except the Space Catalog. Write locks exist on individual files, and are held until the commit is completed. A commit latch on an FSCB serializes commits of Space Catalog changes. The FSCB latch is only held while doing the commit call to the Space Access System, thereby minimizing the period of non-concurrency for writers to a particular file space.

The basic sequence of operations at commit time is illustrated in FIG. 5, and is:

a. Update all catalogs except the Space Catalog.

b. Update the Space Catalog from FSCBs, latching the FSCBs.

c. Invoke the Space Access System to commit the catalog and file changes.

d. Release the FSCB latch.

This results in minimizing the period of non-concurrency for multiple Application Support Processors participating in updates to separate files in a file space. Reference is now made to the particular sequence of steps illustrated in FIG. 5.

1. Request Management 32 routines that cause changes in file space consumption build WRBs containing information required for updating FSCBs and Space Catalog records. These WRBs accumulate until the completion of the work unit.

2. At the completion of the work unit, the Work Routine of Session Management 20 processes successful (commit) or unsuccessful (rollback) work. For the commit of space management, this involves coordinated update of the FSCB and the corresponding Space Catalog records for which other Application Support Processors may concurrently have outstanding work units. For rollback of space management, the Space Management 34 Rollback operation is invoked to restore the FSCB SPACE CURRENTLY CONSUMED field to the value at the beginning of the work unit.

3. In addition to Space Catalog changes, the WRBs also cause updates to the Object Catalog (file characteristic and description changes). The Work Routine 28 invokes Catalog Management 36 to make these changes to the Object Catalog.

4. If there is an error in the update of the Object Catalog, the Storage Access Processor 18 does rollback processing to reverse all catalog and file changes for the current work unit.

5. In addition, such an error causes invocation of Space Management 34 to restore the original value of SPACE CURRENTLY CONSUMED in the FSCBs (Rollback operation in Space Management), and the Work Routine commit processing is terminated.

6. With the successful update of the Object Catalog, Space Management 34 is invoked to update the Space Catalog. This is done by a Commit operation of Space Management.

7. If there is a failure in the Space Management Commit operation, the Storage Access System 18 must rollback all catalog changes and the Work Routine 28 commit processing is terminated.

8. The Storage Access System 18 is invoked to commit all of the catalog changes and file changes for the current work unit.

9. If the Storage Access System 18 commit for the current work unit fails, the Space Management 34 UNDO operation is invoked to backout any changes to the FSCB made for the current work unit. FSCB latches are also released.

10. If commit processing is successful, the Space Management 34 UNLATCH operation is invoked to release latches on FSCBs. Latches are acquired by the Space Management COMMIT operation and held during Storage Access Processor 18 commit to ensure that another Application Support Processor does not attempt to use the FSCBs to commit its work unit until the current work unit commit is completed.

11. The Space Management 34 COMMIT operation processes all WRBs for the current work unit that have recorded space management changes.

12. Before applying changes to the FSCB, the FSCB latch is acquired and the status of the FSCB is saved in the UNDO List 76 so that it can be restored in the event of a failure. The UNDO List is also used to indicate which FSCBs have been latched for the commit.

13. The WRB changes are applied to the corresponding FSCBs.

14. Catalog Management 36 is invoked to update the Space Catalog 74 accordingly.

15. The Space Management 34 Unlatch operation releases latches for each FSCB that is represented in the UNDO List.

16. The Space Management 34 UNDO operation processes the UNDO List, releasing latches and restoring all FSCBs to their status before the work unit began.

17. The Space Management 34 Rollback operation uses the SPACE CONSUMED-CURRENT WORK UNIT in either the WRBs or FCBs to back out the affect of the current work unit on the SPACE CURRENTLY CONSUMED field in the corresponding FSCBs. FCBs apply for those cases where no WRB had been created from the FCB at the time of the failure.

Latches are mechanisms which provide serialization between multiple Data Access System activations that may operate concurrently. The following two types of latches are used in Space Management:

The Hash Table Entry Latch—which synchronizes the following for a particular synonym chain of FSCBs: searching for FSCBs, adding FSCBs, deleting FSCBs, changing the ACTIVITY COUNT for an FSCB in the chain, and changing SPACE CURRENTLY CONSUMED for an FSCB in the chain.

The FSCB Latch—which synchronizes Space Catalog updates, preventing other activations from doing likewise for the latched FSCB until the commit by the latching activation is complete. When multiple FSCBs are involved in a single commit, latches are acquired for the FSCBs, and Space Catalog updates occur in an order dictated by their respective Application Support Processor ID values. This assures that deadlocks between sharing activations are prevented.

When both types of latches are required concurrently, the Hash Table Entry Latch is acquired first to prevent deadlocks.

The following operations are supported by Space Management 34, the more complicated of which are illustrated in the logic flow diagrams of FIGS. 6 through 11:

1. ADD-SPACE

This operation adds to the file space permitted for the specified Application Support Processor. Input is the Application Support Processor ID and the space quantity increment.

Build a WRB for the request.
Set the REQUEST TYPE to ADD-SPACE.
Store the Application Support Processor ID.
Put the space quantity increment value in the PARAMETER VALUE field.
Put the WRB in the chained list for processing at the end of the work unit.

2. DELETE SPACE

This operation reduces file space permitted for the specified Application Support Processor. Input is the Application Support Processor ID and the space quantity for reduction.

Processing is about the same as for ADD-SPACE except the REQUEST TYPE is DELETE-SPACE.

3. CHANGE-THRESHOLD

This operation changes the threshold value for the file space, changing the point at which warnings will occur. Input is the new threshold percentage and the Application Support Processor ID.

Build a WRB for the request.
Set the REQUEST TYPE to CHANGE-THRESHOLD.
Store the Application Support Processor ID.
Put the new threshold value in the PARAMETER VALUE field.
Put the WRB in the chained list for processing at the end of the work unit.

4. CHECK-THRESHOLD

This operation updates the SPACE CURRENTLY CONSUMED field of the FSCB and returns an indicator if the threshold has been reached. Input is the Application Support Processor ID, the change value, and an FCB locator.

Hash the Application Support Processor ID to determine the Hash Table Entry.
Acquire the latch for the Hash Table Entry.
Add the SPACE CONSUMED-CURRENT REQUEST of the FCB to the SPACE CURRENTLY CONSUMED of the FSCB
If SPACE CURRENTLY CONSUMED ≧ the product of the SPACE THRESHOLD and the SPACE LIMIT, then return a warning indicator.
Add SPACE CONSUMED-CURRENT REQUEST to SPACE CONSUMED-CURRENT WORK UNIT.
Release the latch on the Hash Table Entry.

5. QUERY-SPACE

This operation returns information from the Space Catalog for the specified Application Support Processor. Information includes SPACE LIMIT, SPACE THRESHOLD, and SPACE COMMITTED.

Read the appropriate Space Catalog record.
Return the information from the record.

6. CREATE-FSCB

This operation attempts to find an existing FSCB for the specified Application Support Processor. If an existing FSCB is found, the ACTIVITY COUNT is incremented by one. If an existing FSCB in not found, an FSCB is created. Input is an Application Support Processor ID. An FSCB locator is returned.

Hash the Application Support Processor ID to get the Hash Table Entry.
Acquire the latch for the hash Table Entry.
Search for the FSCB for the Application Support Processor in Hash Table synonym chain.
If FSCB not found:
    Read the Space Catalog record for the Application Support Processors file space.
    Build an FSCB from the Space Catalog record. Set the ACTIVITY COUNT to one.
    Put the FSCB in the Hash Table synonym chain.
If FSCB found, increment ACTIVITY COUNT by one.
Release the latch on the Hash Table Entry.
Return the locator to the FSCB.

7. ACQUIRE-FSCB

This operation uses an FSCB locator to go directly to an FSCB and increments its ACTIVITY COUNT by one. Input is an FSCB locator. The operator is used in lieu of CREATE FSCB when the locator is known.

Use the Application Support Processor ID in the FSCB located using the input parameter locator to hash to an FSCB Hash Table Entry.
Acquire a latch for the Hash Table Entry. Increment the ACTIVITY COUNT of the FSCB by one.
Release the latch for the Hash Table Entry.

8. RELEASE-FSCB

This operation releases the current FSCB from the Data Access System. There is no input. The FSCB locator from the current DAS Local Control is used.

Use the Application Support Processor ID in the FSCB located using the input parameter locator to hash to an FSCB Hash Table Entry.
Acquire a latch for the Hash Table Entry.
Decrement the ACTIVITY COUNT of the FSCB by one.
If the ACTIVITY COUNT is zero, release the FSCB from the Data Access System, unchain it, and make it available for reuse.
Release the latch for the Hash Table Entry.

9. COMMIT

This operation applies changes for the current work unit to the FSCB and uses the changes to update the corresponding Space Catalog records. Input is a chained list of WRBs containing file space change information. FIGS. 6, 7 and 8, when placed together with FIG. 6 on top, FIG. 7 in the middle, and FIG. 8 on the bottom, illustrate a logic flow diagram of the COMMIT operation supported by Space Management 34 and explained hereinbelow.

Order all WRBs by the Application Support Processor ID.
Process each WRB in the order; for each:
    If REQUEST TYPE=ADD-SPACE, DELETE-SPACE, or CHANGE-THRESHOLD, then invoke CREATE-FSCB (for the WRITE-SPACE requests, this will have been done by a file access routine of Request Management 32 when the file was first accessed).
    If this is the first WRB for the Application Support Processor ID, then:
        a. Hash the Application Support Processor ID to determine the FSCB Hash Table entry.
        b. Acquire the FSCB latch.

c. Save the FSCB Locator, REQUEST TYPE, and Application Support Processor ID in the UNDO List from the corresponding values for the associated FSCB.

d. If the REQUEST TYPE IS ADD-SPACE or DELETE-SPACE, then store the FSCB SPACE LIMIT in the SAVE VALUE field of the UNDO List.

e. If the REQUEST TYPE IS CHANGE-THRESHOLD, then store the FSCB SPACE THRESHOLD in the SAVE VALUE field of the UNDO List.

f. If the REQUEST TYPE IS WRITE-SPACE, then store the FSCB SPACE COMMITTED in the SAVE VALUE field of the UNDO List.

Add one to the ACTIVITY COUNT in the UNDO List. If REQUEST TYPE is ADD-STORAGE, then increment the SPACE LIMIT in the FSCB by the value of the PARAMETER VALUE in the WRB.

If REQUEST TYPE is DELETE-STORAGE, then decrement the SPACE LIMIT in the FSCB by the value of the PARAMETER VALUE in the WRB If REQUEST TYPE is CHANGE-THRESHOLD, then replace the SPACE THRESHOLD in the FSCB with the value of the PARAMETER VALUE in the WRB.

If REQUEST TYPE IS WRITE-SPACE, then:

a. Add the SPACE CONSUMED-CURRENT WORK UNIT of the WRB to the SPACE COMMITTED of the FSCB and the SPACE CURRENTLY CONSUMED Of the UNDO List.

b. If SPACE COMMITTED Of the FSCB is greater than SPACE LIMIT of the FSCB, then set the error indicator.

c. If this is the last WRB for an Application Support Processor ID, update the Space Catalog record with the changed values from the corresponding FSCB.

If the error indicator is set, then invoke the UNDO operation.

10. ROLLBACK

This operation reverses updates to the SPACE CURRENTLY CONSUMED field of all FSCBs associated with the current work unit. WRBs and FCBs for the current work unit are used as input. FIG. 9 illustrates a logic flow diagram of the ROLLBACK operation supported by Space Management 34 and explained hereinbelow.

Process all FCBs for the work unit:
a. Use FSCB LOCATOR in the FCB to get the Application Support Processor ID.
b. Hash it to the Hash Table Entry.
c Acquire the Hash Table Entry latch.
d. Reduce the ACTIVITY COUNT in the FSCB by one.
e. If the ACTIVITY COUNT is zero, release the FSCB
f. If the activity count is not zero, reduce the SPACE CURRENTLY CONSUMED in the FSCB by the value in the SPACE CONSUMED-CURRENT WORK UNIT of the FCB.
g. Release the latch on the Hash Table Entry.

Process all WRBs for the work unit:
a. Use FSCB LOCATOR in the WRB to get the Application Support Processor ID.
b. Hash it to the Hash Table Entry.
c. Acquire the Hash Table Entry Latch.
d. Reduce the ACTIVITY COUNT In the FSCB by one.
e. If the ACTIVITY COUNT is zero, release the FSCB.
f. If the ACTIVITY COUNT is not zero, reduce the SPACE CURRENTLY CONSUMED in the FSCB by the value in the SPACE CONSUMED-CURRENT WORK UNIT of the WRB.
g. Release the latch on the Hash Table Entry.

11. UNDO

This operation reverses all changes to FSCBs for the current work unit, reduces the ACTIVITY COUNT for FSCBs, and releases the latches on the FSCBs. Input is an UNDO List. FIG. 10 illustrates a logic flow diagram of the UNDO operation supported by Space Management 34 and explained hereinbelow.

Process each element of the UNDO List:
Hash the Application Support Processor ID.
Acquire the Hash Table Entry Latch.
If REQUEST TYPE is WRITE-SPACE, then
  a. Restore SPACE COMMITTED in the FSCB with the SAVE VALUE of the UNDO entry.
  b. Reduce SPACE CURRENTLY CONSUMED in the FSCB by the value of SPACE CURRENTLY CONSUMED in the UNDO entry.

If REQUEST TYPE is ADD-SPACE or DELETE-SPACE, then Restore SPACE LIMIT in the FSCB with the SAVE VALUE of the UNDO entry.

If REQUEST TYPE is CHANGE-THRESHOLD, then Restore SPACE THRESHOLD in the FSCB with the SAVE VALUE of the UNDO entry.

Reduce ACTIVITY COUNT in the FSCB by the value of the ACTIVITY COUNT in the UNDO entry.

If the ACTIVITY COUNT is zero, release the FSCB, unchaining it, and making it available for reuse.
If the ACTIVITY COUNT is not zero, then proceed.
Release the FSCB Latch.
Release the latch on the FSCB Hash Table Entry.

12.

This operation release latches on all FSCBs for which latches were acquired in the current work unit and reduces the ACTIVITY COUNT for the FSCBs. FIG. 11 illustrates a logic flow diagram of the UNLATCH operation supported by Space Management 34 and explained hereinbelow.

Process each element of the UNDO List:
Hash the Application Support Processor ID.
Acquire the Hash Table Entry Latch.
Reduce ACTIVITY COUNT in the FSCB by the value of the ACTIVITY COUNT in the UNDO entry.
If the ACTIVITY COUNT is zero, release the FSCB, unchaining it, and making it available for reuse.
If the ACTIVITY COUNT in the FSCB is not zero, then proceed.
Release the FSCB Latch.
Release the Latch on the FSCB Hash Table Entry.

While a preferred embodiment and several variations of the present invention for a Space Management System for a File Access Processor are described in detail herein, it should be apparent that the disclosure and teachings of the present invention will suggest many alternative designs to those skilled in the art.

What is claimed is:

1. A method of managing file space in a data access system which provides shared file access to a plurality of application support processors, comprising the steps of:

keeping in a space catalog the various file space parameters associated with each logical file space assigned to a particular application support processor;

creating a file space control block that contains information which relates to said logical file space in order to help coordinate changes which affect the amount of file space needed;

building work request blocks o keep track of changes in file space consumption caused by work unit routines generated by one of the application support processors;

in the event of a successful completion of a work unit routine, performing a commit operation by transferring the changes in file space consumption from the work request blocks to the space catalog as well as to the appropriate file space control block.

2. The method of claim 1 which further includes the step of performing a rollback operation in the event of an unsuccessful completion of a work unit routine by restoring the information in the file space control block back to its values at the beginning of the work unit.

3. The method of claim 2 which further includes the step of keeping a list of original information values of a file space control block for use in performing said rollback operation.

4. The method of claim 1 wherein said creating step includes keeping track of changes which delete space, or add space, as well as keeping track of a threshold value for file space at which point warnings will occur.

5. The method of claim 1 wherein said work unit routines include both reading files as well as writing files by said plurality of application support processors.

6. The method of claim 1 wherein said step of creating further includes creating an activity counter in the file space control block that is incremented for each activity that involves a change in file space consumption and is decremented for each committed or terminated activity in order to assure that each file space control block is maintained for continued use without being prematurely released.

7. A method of managing file space in a data access system which provides shared file access to a plurality of application support processors, comprising the steps of:

keeping in a permanently maintained space catalog the various file space parameters associated with logical file space used by said plurality of application support processors;

creating a temporary file space control block which contains some of the same type of information in the space catalog, as well as additional information relating to space activity for a particular file space associated with one application support processor as well as a latching control to assure sequential access to the particular file space by said plurality of application support processors;

building work request blocks to keep track of changes in file space consumption caused by work unit routines;

performing a commit operation in the event of a successful completion of a work unit routine by transferring the changes in file space consumption from the work request blocks to the appropriate file space control blocks; and performing a rollback operation in the event of an unsuccessful completion of a work unit routine by restoring each file space control block to its original values which existed when the work unit routine was commenced.

8. In a data access system which manages shared access by a plurality of application support processors to data files and related directory information, a space management system for managing file space assigned to the support processors comprising:

a space catalog for recording therein a record of each application support processor representing logical file space that is assigned to each application support processor;

control structure means connected to said space catalog for building a file space control block from a space catalog record when a work unit is initiated for a particular application support processor;

a global control structure in communication with the related directory information and which is maintained permanently for all activations of the data access system and which includes locator means for locating file space control blocks having file space information in temporary storage; and updating means connected to said space catalog for updating the records representing the particular application support processor's logical file space when said work unit is finished and committed.

9. The space management system of claim 8 wherein multiple application support processors can consume space in a file space concurrently, and further including means for supporting on-line administration of a common set of space consumption limits and thresholds.

10. The space management system of claim 9 which further includes coordination means for minimizing periods of non-concurrency for multiple application support processors participating in updates to separate files in a file space, and which further includes locking means for using write locks to prevent concurrent changes to a file, with said locking means allowing concurrent changes to different files in a file space except during a period of updating said space catalog and committing of a work unit.

11. The space management system of claim 10 wherein said coordination means allows space catalog change coordination between contending application support processors in such a manner as to maximize concurrency by a sequence of operations at commit time in which all catalogs are initially updated except the space catalog, and wherein said locking means provides for write locks to exist on individual files to be held until a commit is completed, and further including a commit latch on a file space control block for serializing commits of changes of said space catalog and to hold only during a commit, thereby minimizing any period of non-concurrency for writers to a particular file space.

12. The space management system of claim 9, wherein an authorizing application support processor can authorize another application support processor to share its file space, and when an application support processor initiates file space consumption in its own file space, a file space control block created during activation initiation is utilized for space management, and when file space consumption is in a file space of another authorizing application support processor, the initiating application support processor utilizes a file space control block created during activation of the authorizing owning application support processor, and if the authorizing application support processor is not active, a file space control block is created by the first application support processor that utilizes the file space.

13. The space management system of claim 8 wherein said file space control block includes fields for: space limit which defines a total space permitted for files; space threshold which is a predetermined percentage of the space limit; space currently consumed which provides a continually updated value to determine if the space threshold has been reached based on work requests; space committed which provides a continually updated value based on work units committed; and file space control block latch used to synchronize changes to the space catalog.

14. The space management system of claim 8 wherein said file space control block includes an activity counter for controlling the release of a file space control block by being incremented for each activity initiated that involves a change in space consumption and decremented for each committed or terminated activity of that file space control block in order to avoid release of a file space control block when it is currently active.

15. The space management system of claim 8 wherein said global control structure includes a file space control block hash table through which a file space control block of a particular application support processor can be located.

16. The space management system of claim 8 which further includes a local control structure having space management fields which include a locator that is set when a file access is initiated in order to provide rapid access to a particular file space control block.

17. The space management system of claim 16 wherein said local control structure has space management fields which keep track of space consumed by completion of most current request against a particular file space as well as space management fields which keep track of space consumed by completion of all space consumption changes resulting from a current work unit.

18. The space management system of claim 8 which further includes a work request block for retaining space consumption information needed to update the space catalog when a work unit is successfully completed and committed, and wherein a separate work request block is provided for each record in each catalog that must be updated.

19. The space management system of claim 18 wherein said work request block includes fields for: change in space consumption caused by a current work unit; type of request that affected space consumption; parameter values for new space limit or new space threshold warning value; and a copy of the space catalog record associated with this work request block.

20. The space management system of claim 8 which further includes retention list means for saving space information initially kept in a file space control block at the beginning of a current work unit to that a modified file space control block can be restored to its initial values if a failure occurs in the course of processing the work unit.

* * * * *